United States Patent
Orlo et al.

(10) Patent No.: US 7,607,726 B2
(45) Date of Patent: Oct. 27, 2009

(54) MOVABLE SEAT BACK TRAY

(75) Inventors: Kenneth Micheal Orlo, Clinton Township, MI (US); Christopher Scott Welch, Pontiac, MI (US); Ronald Andrew Mueller, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 11/848,561

(22) Filed: Aug. 31, 2007

(65) Prior Publication Data

US 2009/0058152 A1  Mar. 5, 2009

(51) Int. Cl.
*B60N 2/32* (2006.01)

(52) U.S. Cl. .................. 297/125; 297/146; 297/188.05; 248/421; 296/37.8

(58) Field of Classification Search .................. 297/112, 297/125, 344.15, 146, 188.05, 344.151; 108/84, 108/95, 96, 145, 147; 296/37.8, 37.16; 248/421, 248/588
See application file for complete search history.

(56) References Cited

U.S. PATENT DOCUMENTS

| | | | | |
|---|---|---|---|---|
| 399,220 A * | 3/1889 | Timroth | ...................... | 108/145 |
| 1,754,974 A * | 4/1930 | Warfield | ...................... | 248/421 |
| 1,807,960 A * | 6/1931 | Brownell | ............... | 297/344.15 |
| 2,581,023 A * | 1/1952 | Jerick | ............................. | 108/4 |
| 4,312,491 A * | 1/1982 | Aondetto | ...................... | 248/421 |
| 4,744,712 A * | 5/1988 | Mitchell | ...................... | 108/145 |
| 4,934,647 A * | 6/1990 | Edwards | ...................... | 248/421 |
| 5,285,992 A * | 2/1994 | Brown | ................... | 297/423.45 |
| 5,588,697 A | 12/1996 | Yoshida et al. | | |
| 5,628,439 A | 5/1997 | O'Hara | | |
| 5,966,285 A | 10/1999 | Sellers | | |
| 6,003,927 A * | 12/1999 | Korber et al. | ............... | 296/37.8 |
| 6,059,358 A | 5/2000 | Demick et al. | | |
| 6,082,815 A | 7/2000 | Xiromeritis et al. | | |
| 6,135,546 A | 10/2000 | Demtchouk | | |
| 6,135,549 A | 10/2000 | Demick et al. | | |
| 6,220,660 B1 | 4/2001 | Bedro et al. | | |
| 6,793,281 B2 | 9/2004 | Duerr et al. | | |
| 6,860,550 B2 | 3/2005 | Wojcik | | |

* cited by examiner

*Primary Examiner*—Peter R. Brown
(74) *Attorney, Agent, or Firm*—Ralph E. Smith

(57) ABSTRACT

A vehicle seat has a seat bottom and a seat back, which pivots at a rear side of the seat bottom. Within the rearward-facing surface of the seat back, a seat back tray is housed. When in a front passenger seat that is folded forward, the seat back tray is easily assessable by a vehicle driver. To adjust the tray horizontally, a pivotable tray top pivots relative to and above a non-pivoting tray top. A track within the tray provides a guide for movement of the pivotable tray top. A scissor lift coupled to an adjustment mechanism including either a hand crank or electric motor, may raise and lower the tray from a retracted position to an extended position, and be fixed at any intermediary position. The tray may be equipped to be lifted to any intermediary position without a hand crank or electric motor in a low-cost, yet effective scissor mechanism.

8 Claims, 5 Drawing Sheets

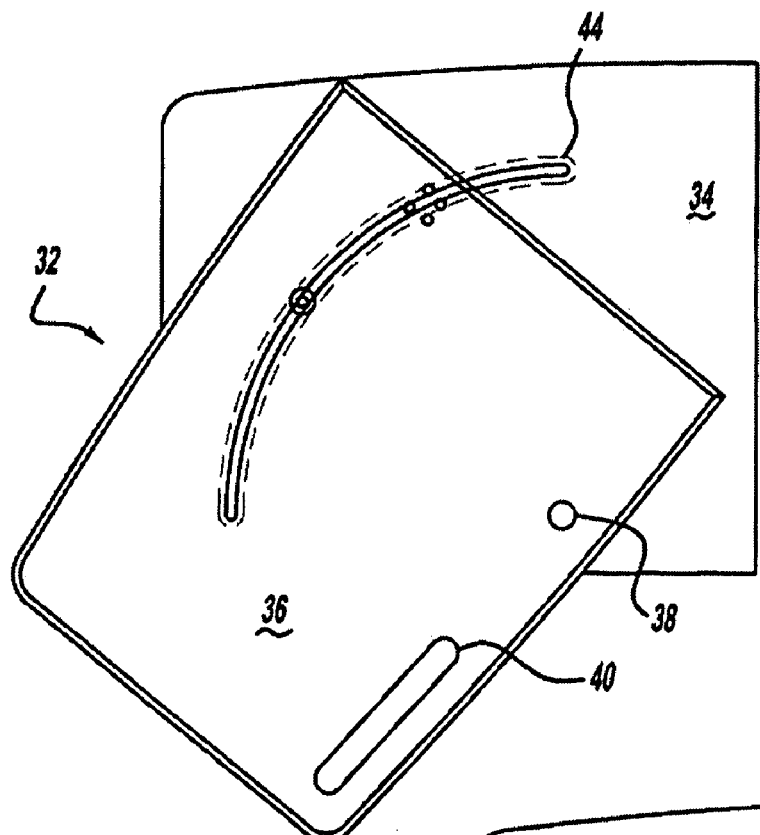
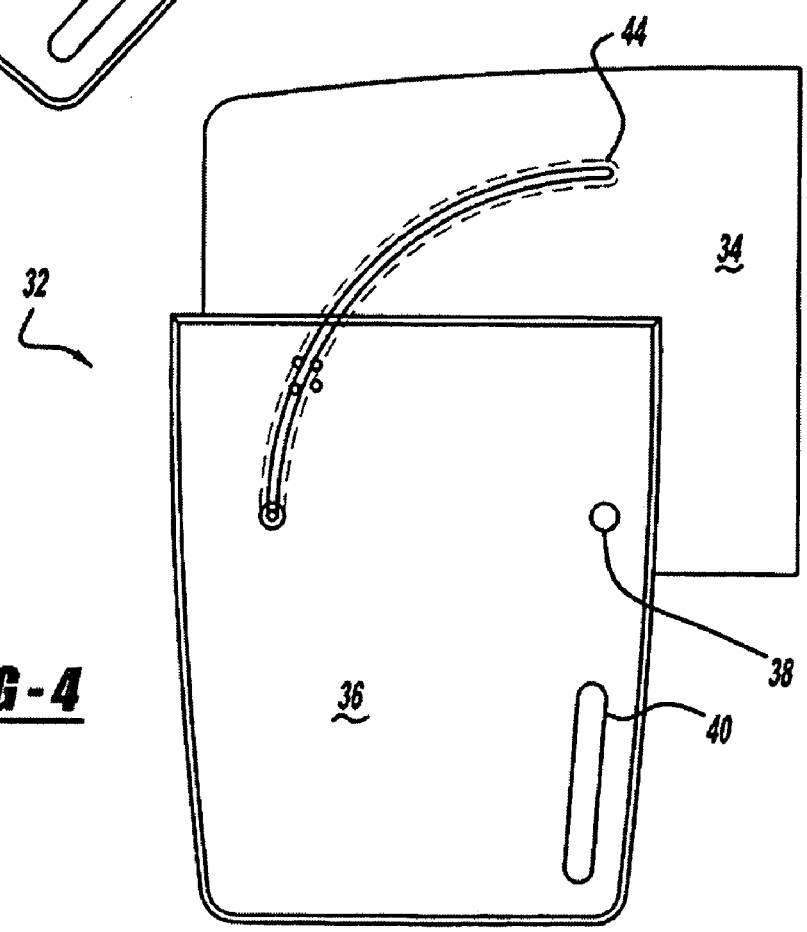

MOVABLE SEAT BACK TRAY

FIELD

The present invention relates to a movable and adjustable tray located within a seat back.

BACKGROUND

Seats in vehicles, such as automobiles, may be folded forward such that a seat back portion of the seat is in a horizontal position to render the seat useful for a purpose other than a seat. In such a horizontal position, the seat back may be equipped with a horizontal table-like structure for placing objects. While such seat backs equipped with horizontal surfaces have proven satisfactory for their given purposes, they are not without their share of limitations.

One such limitation is that such seat backs are not adjustable to situate such a tabletop closer to a user seated in an adjacent seat. Such non-adjustability of the table-top in a horizontal plane may result in items being located farther away from a user in an adjacent seat than desired by the user. Other limitations are that such seat back tabletops are not vertically adjustable and can not accommodate different heights of adjacent users, can not adjust to change the height of an item actually on the tabletop, and can not adjust over an item that may be on an adjacent surface, such as a center console. Still yet another limitation is that such seat back tabletops are only manually adjustable.

What is needed then is a device that does not suffer from the above limitations. This in turn will provide a tabletop device that resides in or upon a pivotable seat back, that adjusts toward and away from an adjacent user and that is height-adjustable. Additionally, such a device will be adjustable by an individual seated in an adjacent seat.

SUMMARY

A vehicle seat may employ a seat bottom and a seat back, the seat back pivoting at a rear of the seat bottom. A seat back tray may be located in a rearward facing surface of the seat back such that when the seat back, in a front passenger seat for example, is folded forward, the seat back tray may be made level and permit a driver seated in a driver seat, next to the passenger seat, to comfortably use the tray without stretching his or her arms. To make use of the seat back tray easier, the tray top may have two separate horizontal tray pieces, one on top of the other, such that one is a pivoting tray top and the other is a non-pivoting tray top. The pivoting tray top may pivot relative to the non-pivoting tray top using a guiding track and a pin such that when the pivoting tray top is pivoted, it may be moved comfortably close to a driver seated in the driver seat.

To adjust the seat back tray vertically from a retracted position to its fully extended position, or any intermediate positions, a scissor lift controlled by an adjustment mechanism, may be employed. The adjustment mechanism may be adjusted by hand, such as with a handle or a crank with or without a ratcheting mechanism, or electrically with an electric motor. In employment of the scissor lift, a shaft turns to extend and retract the scissor mechanism, which results in different vertical positions of the tray top.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a top view of a seat back tray depicted in a horizontally extended position;

FIG. 4 is a top view of a seat back tray depicted in a horizontally extended position;

DETAILED DESCRIPTION

Figure 1:
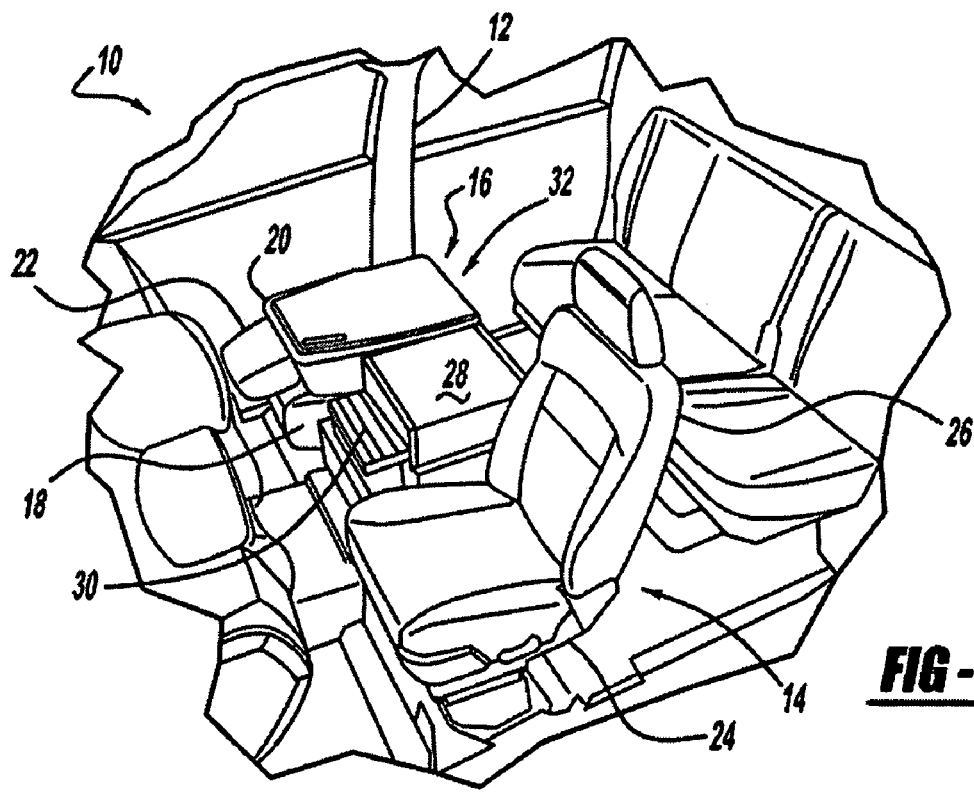
FIG. 1 is a perspective view of a vehicle interior compartment depicting the location of a seat back tray in a retracted position.
Figure 2:
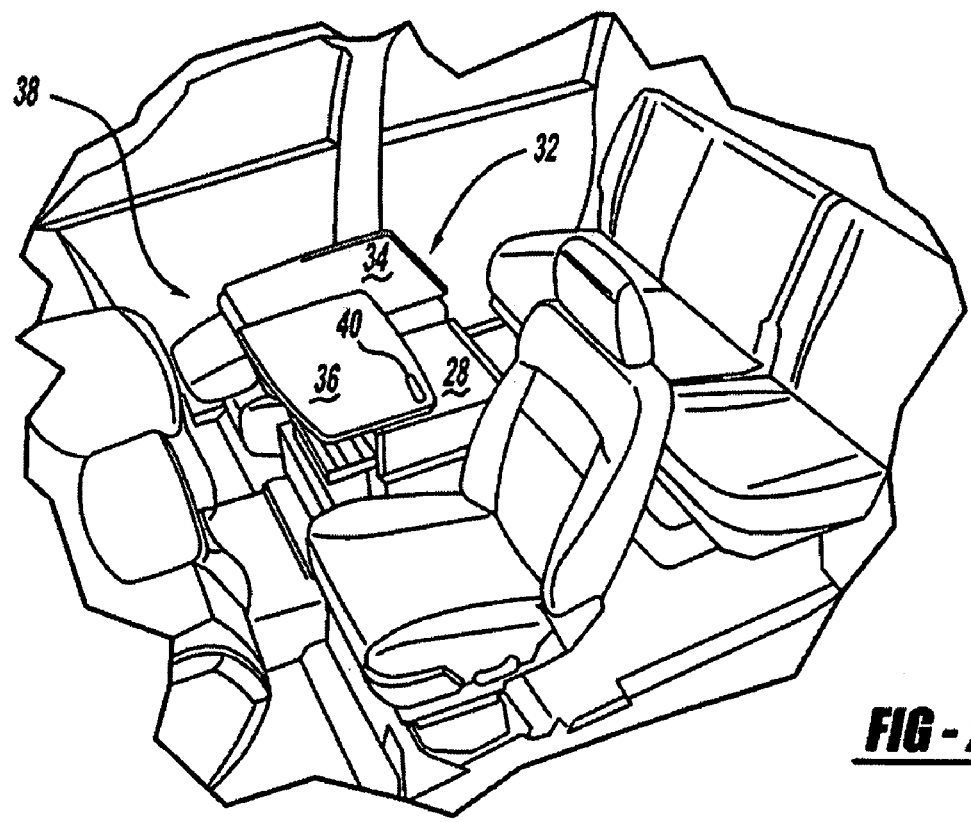
FIG. 2 is a perspective view of a vehicle interior compartment depicting the location of a seat back tray in an extended horizontal position.

The following description of the preferred embodiments is merely exemplary in nature and is in no way intended to limit the invention, its application, or uses. Turning first to FIGS. 1 and 2, a partial interior view of a vehicle 10 is depicted. More specifically, an interior compartment 12 of the vehicle 10 houses a driver front seat 14 and a passenger front seat 16, which is depicted in a folded forward position. Continuing, the passenger front seat 16 is depicted as having a passenger seat bottom 18, a passenger seat back 20, and a passenger seat back headrest 22. The driver front seat 14 also has a driver seat bottom 24 and a driver seat back 26. Between the driver front seat 14 and the passenger front seat 16 is a center console 28. The center console 28, as depicted, may contain file folders 30, such as file folders used to hold standard 8.5"×11" paper, for example, that may be used in the course of business.

Continuing with FIG. 2, the seat back tray 32 has a non-pivoting tray top 34 and a separate pivoting tray top 36. The pivoting tray top 36 may have a corner-located finger groove 40, which when pulled permits the pivoting tray top 36 to rotate in a counter-clockwise fashion over the top surface of the center console 28. When rotated over the center console 28, the bottom of the pivoting tray top 36 will just clear the top surface of the center console 28. The pivoting tray top 36 may pivot about a pivot pin 38 such that a user sitting in the driver front seat 14 may utilize the finger groove 40 to pull the pivoting tray top 36 toward the driver front seat 14 such that the pivoting tray top 36 may be comfortably reached without the outstretched arms of the user sitting in the driver front seat. When the pivoting tray top 36 pivots, as depicted in FIGS. 3 and 4, toward the driver front seat 14, the pivoting tray top 36 moves in an arcuate manner as depicted with the slide groove 44.

Figure 5:
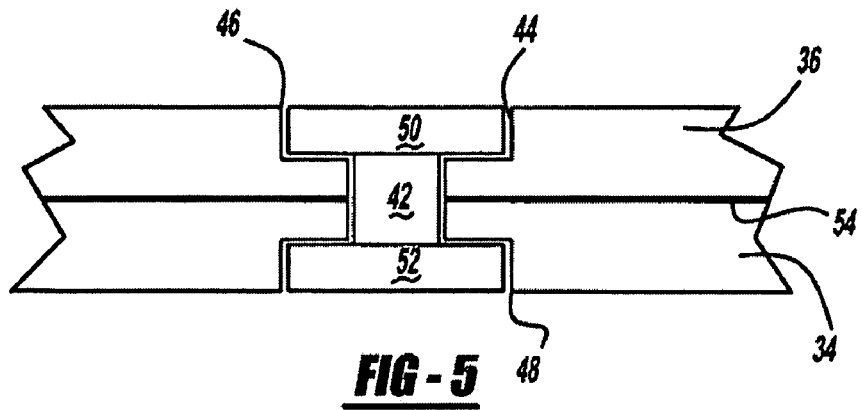
FIG. 5 is a cross-sectional view of a track system of the seat back tray.

More specifically, and continuing with reference to FIGS. 3, 4 and 5, a slide pin 42 resides in a slide groove 44 to permit and guide the arcuate movement of the pivoting tray top 36 in an arcuate manner. More specifically, the slide groove 44 can be viewed as an upper slide groove 46 resident in the pivoting tray top 36 and a lower slide groove 48 resident in the non-pivoting tray top 34. As depicted in FIGS. 3 and 4, the pivoting tray top 36 may be moved through the arc defined by the slide groove 44. To hold the pivoting tray top 36 and non-pivoting tray top 34 together yet permit sliding at the interface 54 of the tray tops 34, 36, a top pin head 50 and a bottom pin head 52 reside on opposite ends of the pin 42. Additionally, such heads 50, 52 are flush with their respective surfaces; that is, the top pin head 50 is flush with the top surface of the pivoting tray top 36 while the bottom pin head 52 is flush with bottom surface the non-pivoting tray top 34. To facilitate sliding, the pivoting tray top 36 and non-pivoting tray top 34 may be made of a plastic that facilitates sliding, such as high density polyethylene (HDPE), but other materials may be used.

Figure 6:
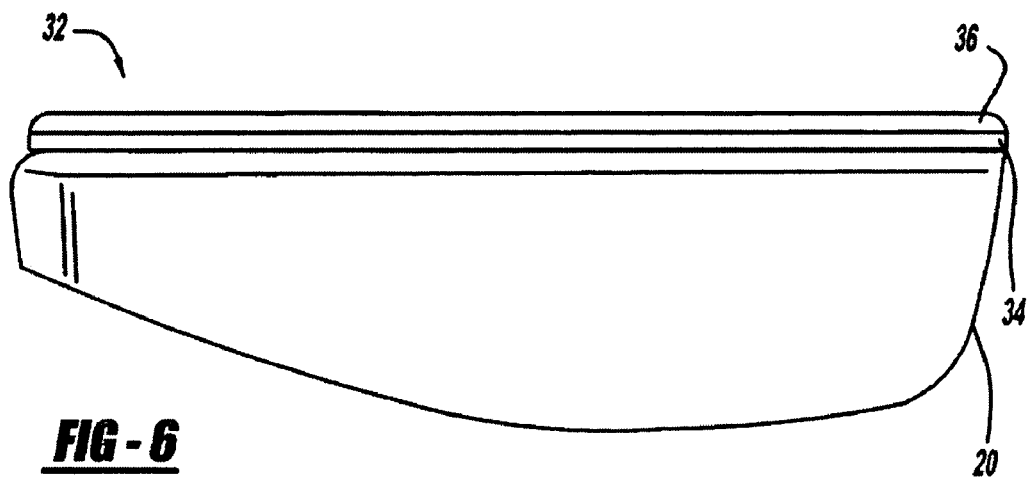
FIG. 6 is a side view of the seat back tray in a non-extended position.
Figure 7:
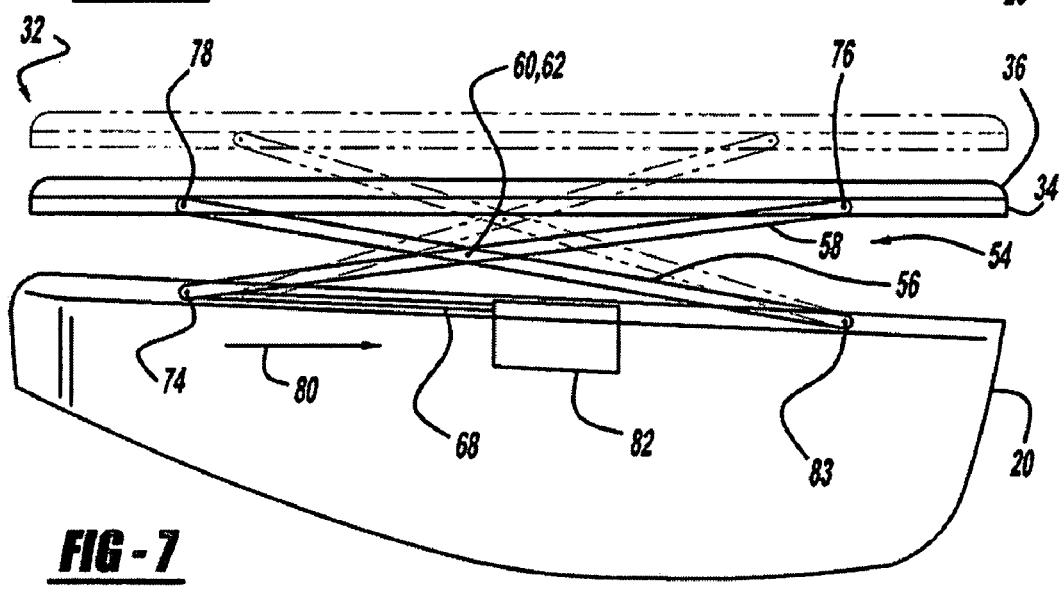
FIG. 7 is a side view of the seat back tray in a vertically-extended position.

Turning now to FIGS. 6 and 7, the vertical adjustability of the seat back tray 32 will be described. FIG. 6 depicts the seat back tray 32 in its most retracted, yet level, position while FIG. 7 depicts the seat back tray 32 in an elevated or raised position, yet still level. To raise or lower the tray 32, a scissor mechanism 54 is adjusted upwardly or downwardly to one of a variety of positions. With reference now including FIGS. 8-10, the scissor mechanism 54 has an inner frame 56 and an outer frame 58 that are connected at locations 60, 62 by fasteners such as pins, rivets, bolts and corresponding nuts, or other fasteners that permit relative movement between the joined inner frame 56 and outer frame 58. Further, the inner frame 56 may employ an inner cross bar 64 to connect the parallel members of the inner frame 56 while the outer frame 58 may employ an outer cross bar 66 to connect the parallel members of the outer frame 58.

In order to raise the tray 32 using the scissor mechanism 54, a shaft 68 may be employed. The shaft 68 may be threaded and coupled to the inner cross bar 64, which may also employ a threaded hole 70 which the shaft 68 may engage. Alternatively, instead of, or in addition to a threaded hole 70, a threaded nut 72 may be tack welded, for example, to the inner cross bar 64. The shaft 68, assuming it is threaded for the sake of the following discussion, may then engage the threads of the threaded hole 70 and/or threaded nut 72. With the shaft end opposite the inner cross bar 64 fixed, the cross bar 64 will move when the shaft 68 is rotated. In one scenario when the shaft 68 is rotated, the inner cross bar 64 will move toward the hinged end 75 of the seat back 20. Because the inner cross bar 64 is connected to the inner frame 56, the inner frame 56 will be lifted vertically to raise the tray 32, as depicted in FIG. 7. Because the inner frame 56 is connected to the outer frame 58 at locations 60, 62, the outer frame 58 moves vertically along with the movement of the inner frame 56.

With continued reference to FIG. 7, when the inner frame 56 is moved vertically along with the outer frame 58, the inner frame slides at ends 74, 76 while the outer frame slides at end 78. More specifically, ends 74 and 78 slide in the direction of arrow 80, while end 76 slides in the direction opposite to arrow 80. To prevent lateral movements, that is, movements in the horizontal plain parallel to the top of tray 32, the ends 74, 76, 78 may reside in grooves where they contact their respective surface. For instance, a groove within which end 74 may reside and travel may be a hard plastic or metal material that also provides support for the scissor lift 54 and tray 32, while a groove or grooves in the tray 32 within which the ends 76, 78 travel, may be in the material from which the non-pivoting tray top 34 is comprised, such as plastic, wood, metal, etc. Such a groove may act as a guide for the ends 74, 76, 78 and prevent lateral or movement in a horizontal plane. As the ends 74, 76, 78 slide toward a vertical plane that passes through pin locations 60, 62, the tray 32 moves vertically upward and when the ends 74, 76, 78 slide away from the vertical plane that passes through locations 60, 62, the tray 32 moves vertically downward.

Figure 8:
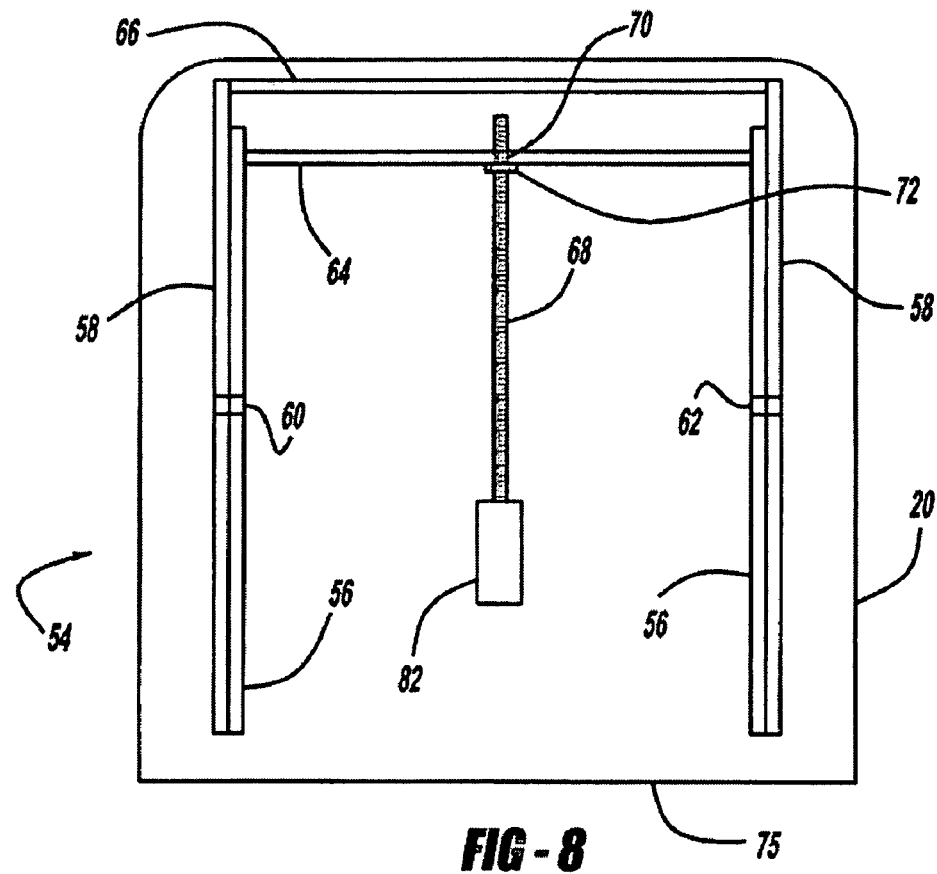
FIG. 8 is a top view of the seat back tray depicting an electric motor that engages a driving shaft.

To cause the shaft 68 to rotate, an electric motor or hand-actuated device may be employed to change the height of the scissor lift 54. With description first of an electric motor as a rotation device, FIGS. 7 and 8 depict an electric motor 82 that drives or rotates the shaft 68 in either a clockwise or counter-clockwise direction to cause the tray 32 to either be lifted or lowered to any intermediate position between its lowest position depicted in FIG. 6, and its highest position, as governed by the scissor mechanism 54. As depicted in the side view of FIG. 7, the motor 82 is mounted within the seat back 20, for example, to a seat back frame (not shown). Because the motor 82 is stationary in its mounted position, and because the end 83 of the outer frame 58 is also a fixed mount, when the motor 82 and shaft 68 are rotated, the ends 74, 76, 78 are able to move as the scissor mechanism either raises or lowers.

Figure 9:
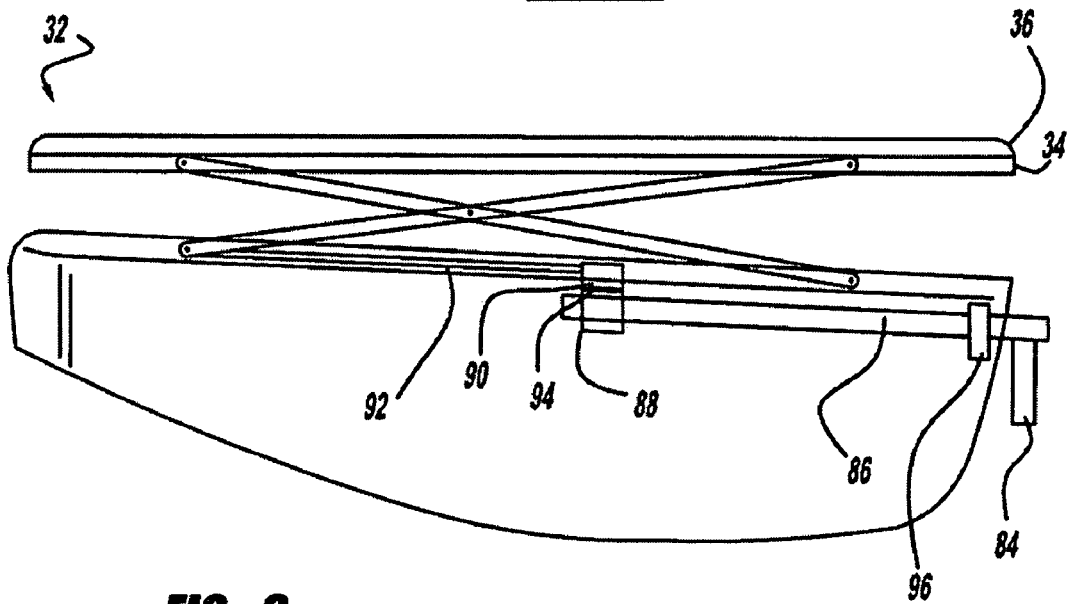
FIG. 9 is a side view of a hand-actuated mechanism employable to raise and lower a seat back tray.
Figure 10:
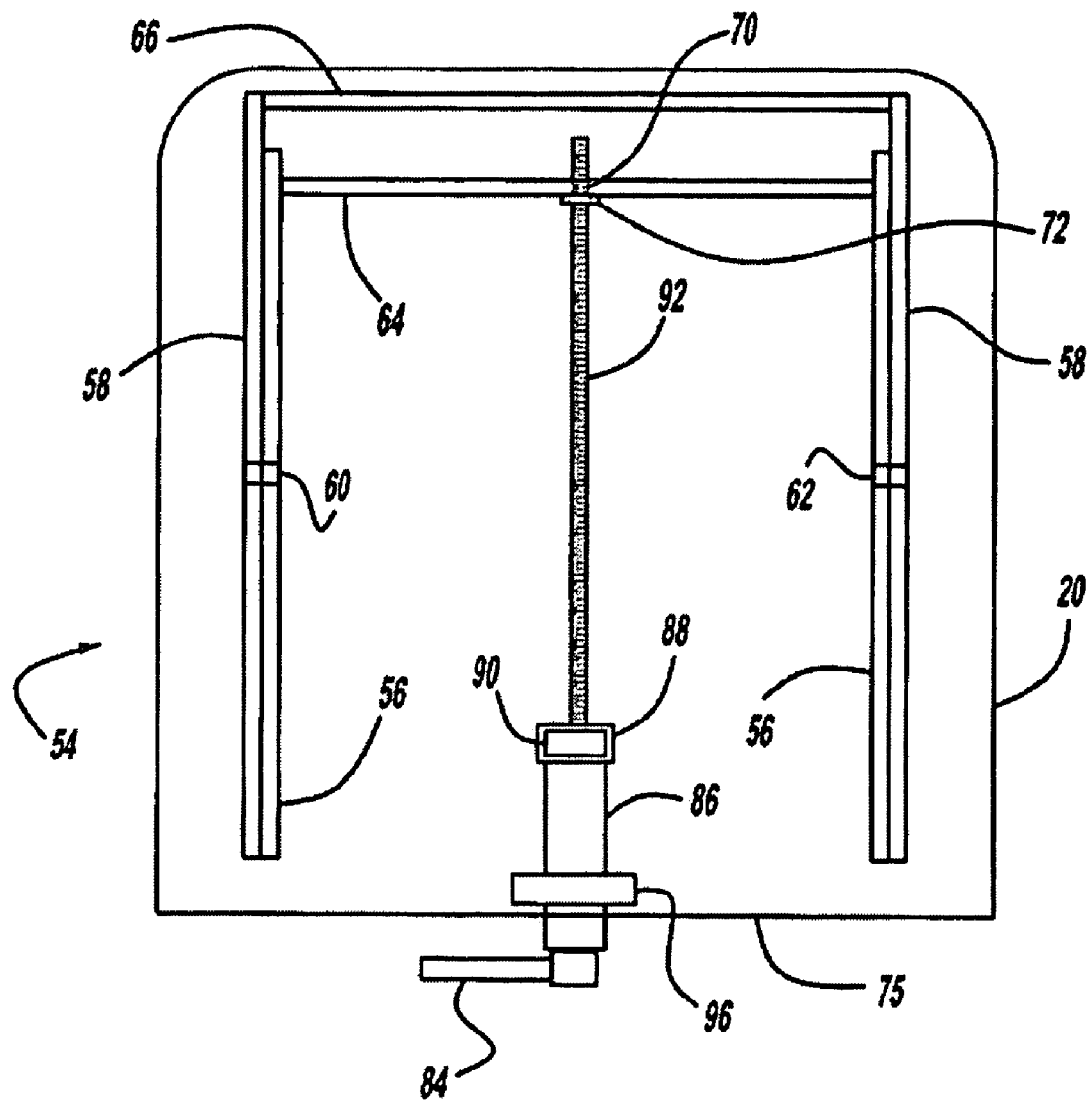
FIG. 10 is a top view of a hand-actuated mechanism employable to raise and lower a seat back tray.

Turning now to FIGS. 9 and 10, another structure for raising and lowering the tray 32 will be discussed. FIG. 9 depicts a side view of a hand-actuated device, such as a hand crank 84 that has a shaft 86 attached to it. The attachment may be with a fastener, weld, or other suitable method of attachment. At an opposite end of the shaft 86 as the hand crank 84, a driving gear 88 is located. The driving gear 88 drives a driven gear 90, which is attached to a shaft 92. The gears 88, 90 contact at an interface 94. The shaft 92 may be a threaded shaft similar to the shaft 68 of FIG. 8. The crank 84 may be hand turned in either a clockwise or counter-clockwise direction with the assistance of a ratcheting mechanism 96, similar to that which may be utilized in a socket ratchet used by an automotive mechanic. More specifically, with the aid of a mechanical switch on the crank 84, the driving direction of the ratcheting mechanism 96 may be changed to effect a raising or lowering of the tray 32 as described above with the motorized device. A ratcheting mechanism 96 is not necessary to the hand-actuated device of FIGS. 9 and 10, as the crank 84 may be turned in either direction without the benefit of a ratcheting device.

FIG. 10 is a top view of the hand-actuated mechanism depicting representative locations of a handle or crank 84, ratcheting mechanism 96, shaft 86, gears 88, 90, shaft 92, inner cross bar 64 with threaded hole 70 and/or a threaded nut 72, inner frame 56, outer frame 58, and outer cross bar 66. Although the Figures are not drawn to scale, one can see that movement of the tray 32 may be performed in conjunction with an electric motor 82 or hand crank 84 and associated mechanism to adjust the scissor mechanism 54.

Although the invention is depicted as being equipped with either an electric motor 82 or a hand crank 84 to vertically adjust the tray 32 using the scissor mechanism 54, the invention does not have to employ either a motor 82 or a hand crank 84 as an adjustment mechanism. In such a configuration, the motor 82 and hand crank 84, and other associated parts for imparting motion to the tray; such as shafts 68 and 92, may be removed, leaving the scissor mechanism 54. To vertically adjust the tray 32, the tray 32 may be simply grasped under or at the sides of the non-pivoting tray top 34 and lifted vertically. Later, the tray 32 may be pressed downward to restore the tray 32 to its lowest position in the seat back 20, such as when the seat back 20 is desired in its vertical position for occupation by a passenger. With such a construction, the inner frame 56 and outer frame 58 may be firmly joined at pin locations 60, 62 to impart sufficient friction between the frames 56, 58 at locations 60, 62 to ensure that the scissor lift 54 remains in place to support a desired load, such as a laptop computer or other device or equipment, upon each adjustment. Such a device provides a simple and economical structure that may be vertically and horizontally adjusted.

There are many advantages associated with the present invention. One advantage is that the device provides a flat tray that is a horizontally and vertically adjustable work surface that may be comfortably positioned next to, or even against, a vehicle driver. In other words, the work surface or tray top 36 is located such that it can be easily used for a task such as typing, writing, reading a book, etc. without uncomfortably stretching or reaching while performing such a task. Another advantage, related to the vertical adjustability of the tray 32, is that an electric motor may be employed to raise the tray 32 over a center console 28 such that when the tray top 36 is horizontally pivoted, it will not strike or contact items that may be on the top of the console, such as a file folder, papers, 12 ounce beverage can, etc. Still yet another advantage is that a totally manual, or non-electrical, scissor mechanism 54 may be employed, such as a hand crank 84 mechanism. This saves component costs, energy costs, and provides a budget solution to providing a work surface directly next to a driver, such as over the center console 28.

Another advantage is that the tray 32 and scissor mechanism may be configured to operate without an electric motor 82 or hand crank 84. This may be accomplished by creating a firm, friction contact between the inner frame 56 and outer frame 58 at locations 60, 62. To create a fit at locations 60, 62 such that the tray 32 will stay at an elevated location, washers with radial grooves (not shown) may be employed, in one example. When the washers rotate relative to each other, the grooves may interlock. Coupled with a tight fit, such an interlocking of grooves will support a load on the tray 32, such as a laptop computer, books, leaning by a person's elbow, etc. Another advantage is that the invention saves space by being located in a seat back 20, such as in a passenger seat 16.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle seat comprising:
   a seat bottom;
   a seat back that pivots at a rear of the seat bottom;
   a seat back tray located in a rearward facing surface of the seat back, the seat back tray including a non-pivotable tray top and a pivotable tray top, whereby the pivotable tray top forms a table top when the seat back is pivoted downwardly to rest on top of the seat bottom;
   a pivot pin rotatably coupled to the non-pivotable and the pivotable tray tops;
   a track, the track providing a guide for pivotable horizontal movement of the pivotable tray top relative to the non-pivotable tray top, the track including an upper slide groove positioned in the pivotable tray top and a corresponding lower slide groove positioned in the non-pivotable tray top;
   a slide pin arranged to be positioned in the track and slidably couple the pivotable tray top to the non-pivotable tray top, the slide pin including a top head, a bottom head, and an intermediate region connecting the top and bottom heads, the top and bottom heads having a larger diameter than the intermediate region, the top head arranged to be positioned in the upper slide groove and the bottom head arranged to be positioned in the lower slide groove so as to couple the pivotable tray top to the non-pivotable tray top while allowing the pivotable tray top to horizontally pivot about the pivot pin relative to the non-pivotable tray top; and
   a scissor lift, wherein the scissor lift permits vertical adjustment of the seat back tray relative to the seat back.

2. The vehicle seat of claim 1, further comprising:
   an electric motor to drive the scissor lift for raising and lowering the table top from a retracted position to an extended position, and any fixed intermediary position.

3. The vehicle seat of claim 1, wherein the scissor lift further comprises a manual adjustment mechanism for raising and lowering the table top from a retracted position to an extended position, and any fixed intermediary position.

4. The vehicle seat of claim 3, further comprising:
   a hand crank attached to the manual adjustment mechanism for adjusting the scissor lift.

5. The vehicle seat of claim 4, wherein the hand crank adjustment mechanism further comprises a ratcheting mechanism coupled to the hand crank for facilitating cranking of the hand crank adjustment mechanism in either a clockwise or counterclockwise direction.

6. A vehicle seat comprising:
   a seat bottom;
   a seat back that pivots at a rear of the seat bottom;
   a seat back tray located in a rearward facing surface of the seat back, the seat back tray including a non-pivotable tray too and a pivotable tray top, whereby the pivotable tray top forms a table top when the seat back is pivoted downwardly to rest on top of the seat bottom and the pivotable tray too is in a non-pivoted position;
   a pivot pin rotatably coupled to the non-pivotable and the pivotable tray tops;
   a track, the track providing a guide for pivotable horizontal movement of the pivotable tray top relative to the non-pivotable tray top, the track including an upper slide groove positioned in the pivotable tray top and a corresponding lower slide groove positioned in the non-pivotable tray top;
   a slide in arranged to be positioned in the track and slidably couple the pivotable tray top to the non-pivotabie tray top, the slide pin including a top head, a bottom head and an intermediate region connecting the top and bottom heads, the top and bottom heads having a larger diameter than the intermediate region, the top head arranged to be positioned in the upper slide groove and the bottom head arranged to be positioned in the lower slide groove so as to couple the pivotable tray to top the non-pivotable tray top while allowing the pivotable tray top to horizontally pivot about the pivot pin relative to the non-pivotable tray top;
   a recess positioned in a top surface of the pivotable tray top, the recess providing a mechanism for engaging the pivotable tray top so as to pivot the pivotable tray top about the pivot pin; and
   a scissor lift, wherein the scissor lift permits vertical adjustment of the seat back tray relative to the seat back.

7. The vehicle seat of claim 6, wherein the scissor lift further comprises a manual adjustment mechanism for raising and lowering the table top from a retracted position to an extended position, and any fixed intermediary position.

8. The vehicle seat of claim 7, further comprising:
   a hand crank attached to the manual adjustment mechanism for adjusting the scissor lift.

* * * * *